US010826366B2

United States Patent
Bailey (10) Patent No.: US 10,826,366 B2
(45) Date of Patent: Nov. 3, 2020

(54) DC EXCITATION OF THE DOUBLY FED BRUSHLESS INDUCTION STARTER GENERATOR

(71) Applicant: SAFRAN ELECTRICAL & POWER, Blagnac (FR)

(72) Inventor: Mark Wesley Bailey, Streetsboro, OH (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 16/379,004

(22) Filed: Apr. 9, 2019

(65) Prior Publication Data

US 2019/0319520 A1    Oct. 17, 2019

Related U.S. Application Data

(60) Provisional application No. 62/655,880, filed on Apr. 11, 2018.

(51) Int. Cl.
*H02K 17/42* (2006.01)
*H02K 3/28* (2006.01)
(Continued)

(52) U.S. Cl.
CPC ............... *H02K 17/42* (2013.01); *H02K 1/14* (2013.01); *H02K 3/18* (2013.01); *H02K 3/28* (2013.01); *H02K 3/48* (2013.01)

(58) Field of Classification Search
CPC ...... H02P 1/00; H02P 1/04; H02P 1/18; H02P 1/24; H02P 1/26; H02P 1/46; H02P 3/00; (Continued)

(56) References Cited

U.S. PATENT DOCUMENTS 4,473,752 A * 9/1984 Cronin .................... F02N 11/04
                                                    123/179.27
4,481,459 A * 11/1984 Mehl ....................... F02N 11/04
                                                    290/38 R (Continued)

FOREIGN PATENT DOCUMENTS

| CN | 103166402 A | * | 6/2013 | ............... H02K 3/28 |
| CN | 103166402 A |   | 6/2013 |  |
| EP | 2940272 A1 |   | 11/2015 |  |
| EP | 3166215 A1 | * | 5/2017 | ............. H02K 1/246 |

OTHER PUBLICATIONS

McMahon et al "Performance of BDFM as Generator and Motor", IEE Proceedings: Electric Power Applications, Institution of Electrical Engineers, GB, vol. 153, No. 2, Mar. 2, 2006, 11 pages.

(Continued)

*Primary Examiner* — Antony M Paul
(74) *Attorney, Agent, or Firm* — Rankin, Hill & Clark LLP (57) ABSTRACT

A doubly fed brushless induction starter generator includes a stator and a rotor, which are separated by an air gap. The stator includes stator winding slots, each of which includes a first layer of power windings, a second layer of power windings, and a third layer of control windings, which include 2-pole single-phase windings. The control windings are arranged in the stator winding slots between the air gap and the first and second layers of power windings. Direct current is delivered to control windings in the generator as an excitation current to thereby produce a magnetic flux, through which the stator is moved to produce and alternating current in the power windings as an output current. The output current can be delivered to an electrical load, such as an electrical component on an aircraft.

17 Claims, 5 Drawing Sheets

(51) Int. Cl.
  *H02K 1/14* (2006.01)
  *H02K 3/18* (2006.01)
  *H02K 3/48* (2006.01)

(58) Field of Classification Search
  CPC .. H02P 6/00; H02P 6/002; H02P 6/005; H02P 6/12; H02P 7/00; H02P 7/06; H02P 7/282; H02P 7/285; H02P 9/00; H02P 9/007; H02P 9/008; H02P 9/08; H02P 21/00; H02P 21/0035; H02P 21/0046; H02P 21/0042; H02P 21/06; H02P 23/00; H02P 25/00; H02P 27/00; H02P 27/04; H02P 27/06; H02P 1/42; H02P 9/38; H02P 9/48; H02K 1/223; H02K 17/36; H02K 21/042; H02K 17/42; H02K 3/28; H02K 1/14; H02K 3/18; H02K 3/48
  USPC .... 318/400.01, 400.02, 400.14, 400.15, 700, 318/701, 727, 800, 801, 244, 251, 288, 318/296, 297, 381, 382
  See application file for complete search history.

(56) References Cited

U.S. PATENT DOCUMENTS

| | | | | |
|---|---|---|---|---|
| 4,830,412 | A | * | 5/1989 | Raad ............... F02N 11/04 290/31 |
| 5,083,077 | A | | 1/1992 | Wallace et al. |
| 10,122,307 | B2 | * | 11/2018 | Gieras ............... H02K 1/246 |
| 2014/0145541 | A1 | | 5/2014 | Jalebi et al. |

OTHER PUBLICATIONS

International Search Report/Written Opinion, PCT/US2019/026498, dated Jul. 17, 2019, 16 pages.
Logan, et al., "Practical Deployment of the Brushless Doubly-Fed Machine in a Medium Scale Wind Turbine", PEDS2009, University of Cambridge, United Kingdom, 6 pages.
Roberts, et al., "Performance of Rotors in a Brushless Doubly-Fed Induction Machine (BDFM)", Cambridge University Engineering Department, Cambridge, UK, presented at International Conference of Electrical Machines, 2004, Cracow, Poland, 6 pages.

* cited by examiner

DC EXCITATION OF THE DOUBLY FED BRUSHLESS INDUCTION STARTER GENERATOR

BACKGROUND

Many aircraft utilize brushed type wound field starter generators. However, these starter generators have brushes and commutators that wear out and need replaced. In contrast, an induction machine is inherently less expensive, less complicated and less heavy compared to a wound field machine.

However, since the excitation for a rotor on an induction machine comes across an air gap from the stator, when a short circuit is applied, the machine excitation collapses. Thus, a standard induction machine based brushless starter generator has a difficult time supplying short circuit current.

BRIEF DESCRIPTION

In an aspect, a brushless induction generator includes a rotor, a stator including power windings and control windings, and an air gap arranged between the rotor and the stator. The control windings are electrically connected to a power source, which provides direct current as excitation current to the control windings, thereby producing a magnetic flux. The rotor moves through the magnetic flux, thereby generating an alternating current in the power windings as an output current.

In another aspect, an aircraft includes a prime mover, a power source, an electrical load, and a brushless induction generator mechanically connected to the prime mover and electrically connected to the power source and the load. The brushless induction generator includes a rotor, a stator, and an air gap arranged between the rotor and the stator. The stator includes winding slots, each of which houses a first layer of power windings, a second layer of power windings, and a third layer of control windings. The power windings are not directly coupled to the control windings. The power source provides direct current as excitation current to the control windings, thereby producing a magnetic flux. The prime mover moves the rotor through the magnetic flux, thereby generating an alternating current in the power windings as an output current, which is delivered to the electrical load.

In another aspect, a method of generating electrical power includes providing a brushless induction generator including a rotor, a stator including power windings and control windings, and an air gap arranged between the rotor and the stator. The method further includes supplying a direct current to the control windings as an excitation current to thereby produce a magnetic flux. The method also includes moving the rotor through the magnetic flux, thereby producing an alternating current in the power windings as an output current.

DETAILED DESCRIPTION

In conventional brushless doubly fed induction generators (BDFM), two power windings of different pole numbers in a single stator are used, with no direct coupling between them, along with alternating current control windings in the stator. This stator is used in combination with a special form of rotor which can couple both fields of the power windings. For wind turbine applications, the frequency of the alternating current delivered to the control winding is automatically adjusted to obtain a constant frequency output from the generator as the shaft speed varies in the wind. For wind turbines, which are connected to commercial power grids, this output frequency varies between 50 Hz and 60 Hz, this is required.

Figure 3:
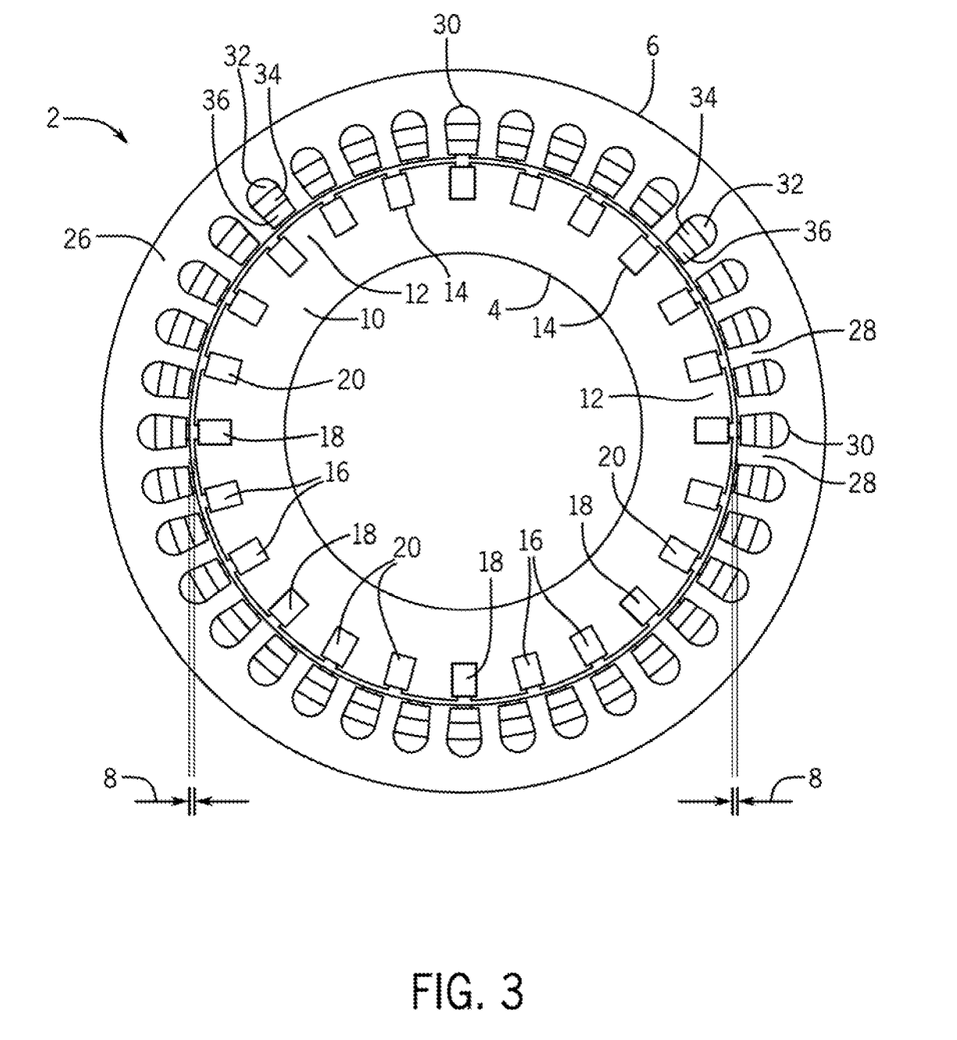
FIG. 3 is a schematic cross-section view of a doubly fed brushless induction generator.

With reference to the figures, the present subject matter includes a brushless doubly fed induction generator 2, which can be used to generate electrical power for an aircraft 54. The generator 2 includes a rotor 4, a stator 6, and an air gap 8 arranged between the rotor 4 and the stator 6. The rotor 4 is depicted in FIG. 3 to be arranged radially inside the stator 6. However, this configuration is not required, and instead the stator 6 may be arranged radially inside the rotor 4.

The generator 2 can be arranged on an aircraft 54 that also includes a prime mover 56, a direct current power source 38, and an electrical load 40. The prime mover 56 is mechanically connected to the generator 2 for rotating the rotor 4 relative to the stator 6. The prime mover 56 may comprise an aircraft engine (e.g. a jet engine or a combustion engine), a propeller, or other component that provides rotational power to rotate the rotor 4.

The electrical load 40 on the aircraft 54 can include one or more electrical components on the aircraft 54, a secondary battery, or other component that is electrically connected to the generator 2 and draws electric power that is generated by the generator 2. The direct current power source is not particularly limited and can include an alternator, a battery, or other direct current power source that is electrically connected to the generator 2 to provide direct current as excitation current to the control windings.

The rotor 4 may comprise a series of stacked metal (e.g. iron) lamina to thereby define a rotor core 10 and a plurality of rotor arms 12 extending radially outward from the rotor core 10 towards the air gap 8 and extend axially along a length $L_1$ of the rotor 4. The rotor arms 12 are circumferentially spaced from one another to thereby define rotor winding slots 14. The rotor winding slots 14 are arranged between each of the circumferentially spaced rotor arms 12 and extend axially along the length $L_1$ of the rotor 4. The rotor 4 may include 24 rotor winding slots 14. More or less rotor winding slots 14 may be used without departing from the scope of the disclosure.

Figure 2:
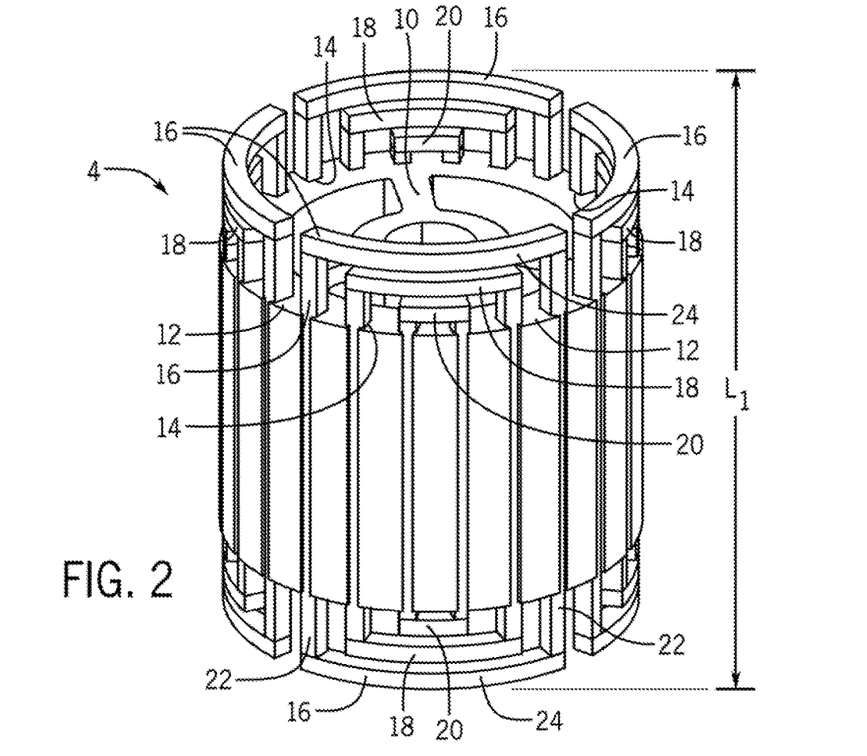
FIG. 2 is a schematic perspective view of a concentric nested loop rotor.

In an embodiment, the rotor 4 comprises a nested loop rotor, including four sets of three independent concentric nested loops 16, 18, 20 arranged in the rotor winding slots 14 as depicted in FIG. 2. The nested loops may each comprise electrically conductive metal (e.g. copper, silver, etc.) bars or wire windings. As used herein, "electrically conductive" or cognate terms, mean a material that has conductivity ($\sigma$) of at least $1 \times 10^2$ S/m at 20° C. In one embodiment as best depicted in FIG. 2, the first nested loop 16 in each set is arranged concentrically outside the second nested loop 18, which is arranged concentrically outside the third nested loop 20, and all of the nested loops 16, 18, 20 each comprise conductive metal bars.

In the first nested loop 16, two longitudinal metal bars 22, 22 are arranged in the rotor winding slots 14 and extend along the length $L_1$ of the rotor 4, and are connected together at each of their ends by lateral metal bars 24, 24. The second and third nested loops 18, 20 have similar configurations to the first nested loop 16 as depicted in FIG. 2, each including longitudinal and lateral metal bars, but are simply smaller loops so as to fit concentrically inside the first nested loop 16. The nested loops 16, 18, and 20 are electrically isolated from one another by being spaced from one another and by not contacting one another. There are four sets of nested loops 16, 18, 20 on the rotor 4 as depicted in the figures, thereby defining four poles on the rotor 4. More or less poles can be included in the rotor 4 as desired. In another embodiment, the rotor winding slots 14 comprise windings of conductive wire.

The stator 6 may comprise a series of stacked metal (e.g. iron) lamina, to thereby define a hollow tube-shaped stator core 26 and a plurality of stator arms 28 that extend radially inward from the stator core 26 towards the air gap 8 and extend axially along a length (into the page of FIG. 3) of the stator 6. The stator arms 28 are circumferentially spaced from one another to thereby define stator winding slots 30. The stator winding slots 30 are arranged between each of the circumferentially spaced stator arms 28 and extend axially along the length of the stator 6. The stator 6 may include 36 stator winding slots 30. More or less stator winding slots 30 may be used.

Within each stator winding slot 30 there are arranged power windings and control windings. In one embodiment, the stator winding slots 30 each house three layers of conductive wire windings—a first layer 32 of power windings, a second layer 34 of power windings, and a third layer 36 of control windings. The third layer 36 is arranged between the air gap 8 and the first and second layers 32, 34. The power windings are not directly coupled to the control windings.

The power windings may be electrically connected in parallel with the electrical load 40. The rotor 4 can couple to both the power windings and the control windings.

Figure 4:
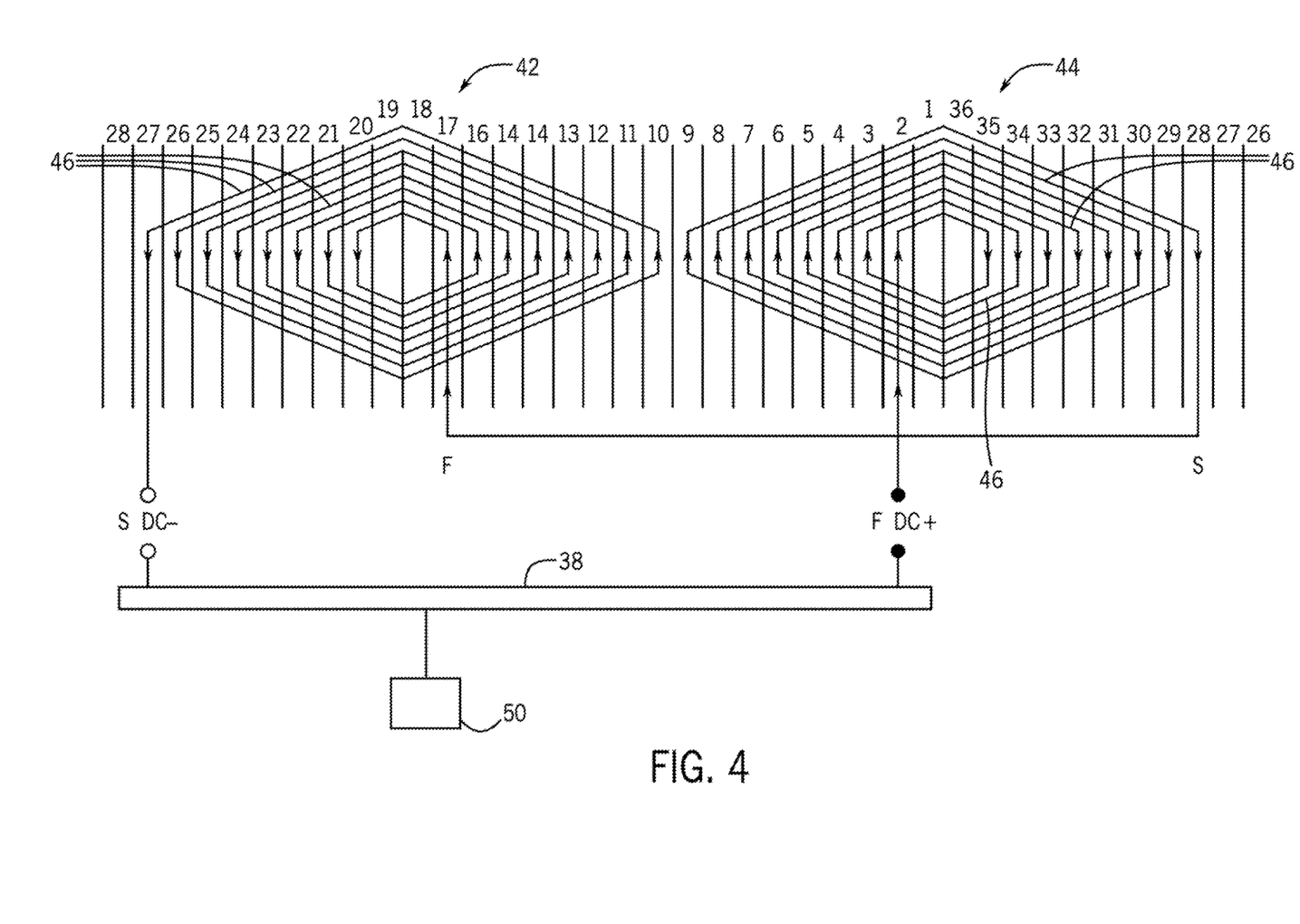
FIG. 4 is a schematic winding diagram for control windings.

The control windings in the third layer 36 are electrically connected to the direct current power source 38, which supplies a direct current as an excitation current to the control windings to create a magnetic flux. The control windings comprise 2-pole single-phase windings, thereby defining a total of two poles. In one embodiment as depicted in FIG. 4, the control windings comprise two sets (i.e., first set 42 and second set 44) of concentric coils 46. Additional sets of concentric coils can be included in the generator 2. The first set 42 and second set 44 may each contain 5-15 concentric coils 46. Each concentric coil 46 can include 5-50 turns of electrically conductive wire (wire turns are not individually shown).

The conductive wire used to form the concentric coils 46 in one set (i.e., 42 or 44) can be one continuous conductive wire that electrically connects all the coils 46 to each other within that one set (i.e., 42 or 44). In other words, all the concentric coils 46 in the first set 42 are electrically connected to each other since the continuous conductive wire extends between them and is used to form them, and similarly, all the concentric coils 46 in the second set 44 are electrically connected to each other. The first and second sets 42, 44 of concentric coils 46 may also be electrically connected to each other as shown in FIG. 4.

In one embodiment, the first set 42 and second set 44 each includes 6-10, or 7, or 8 concentric coils 46, and each concentric coil 46 includes 10-30, or 15-25, or 20 turns of electrically conductive wire. The first set 42 and second set 44 of concentric coils 46 are arranged in the stator winding slots 30. In one embodiment, the first set 42 is arranged in half of the stator winding slots 30, and the second set 44 is arranged in the other half of the stator winding slots 30, with no overlap between the first and second sets 42, 44. That is, the first and second sets 42, 44 of concentric coils 46 may each span half of the circumference of the stator 6 and are arranged in 18 of 36 stator winding slots 30. In other words, each stator winding slot 30 includes only one layer of control windings from only one of the sets 42, 44 of concentric coils 46.

The power windings in the first and second layers 32, 34 are electrically connected to the electrical load 40, which draws electrical power from electric current generated in the power windings during operation of the generator 2. The power windings each comprise 2-pole, 3-phase windings, thereby defining a total of six poles. The different pole counts between the power winding and the control windings, which are electrically isolated from each other, inhibit the power windings from direct coupling with the control windings.

Figure 5:
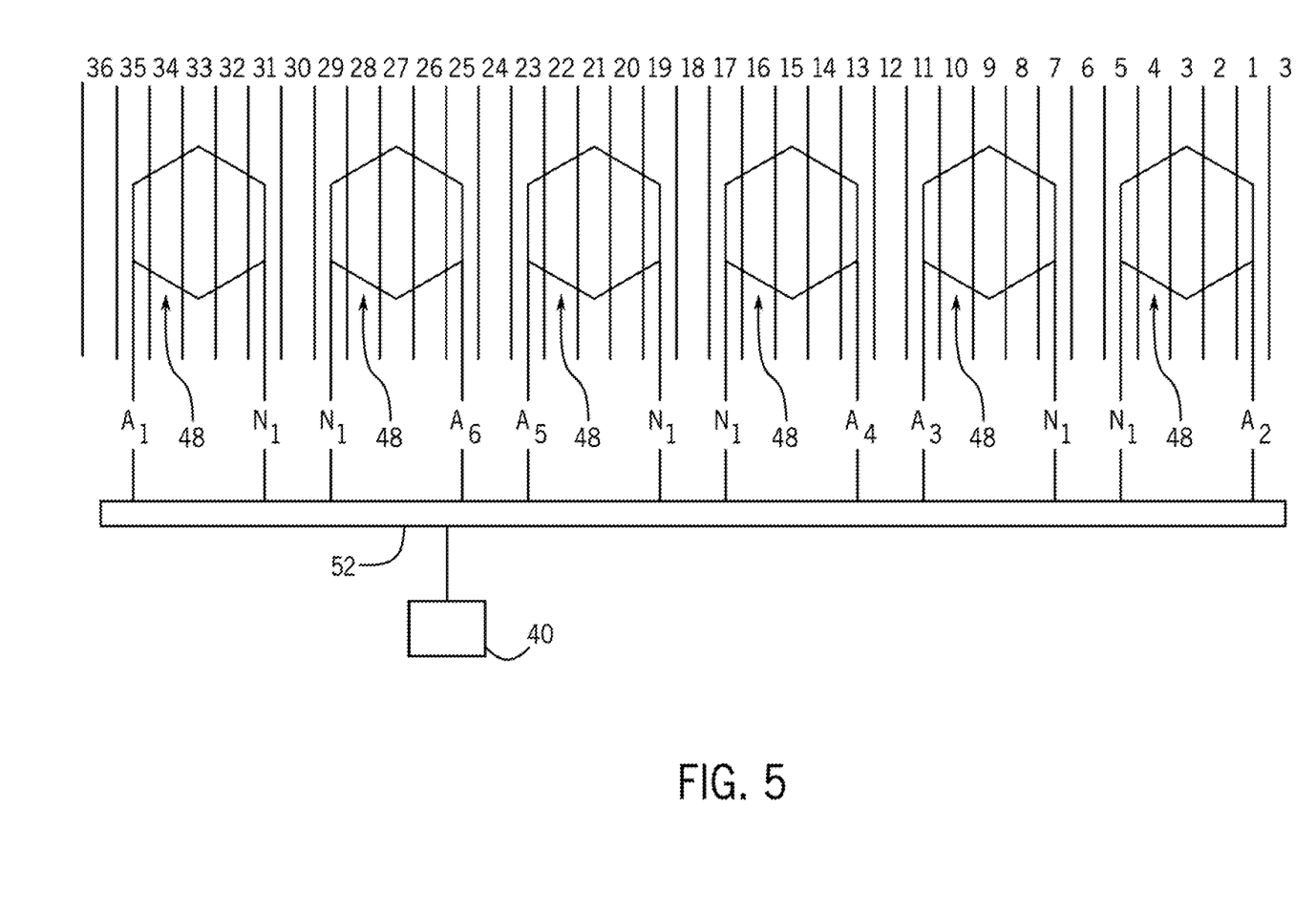
FIG. 5 is a schematic winding diagram for power windings.
Figure 6:
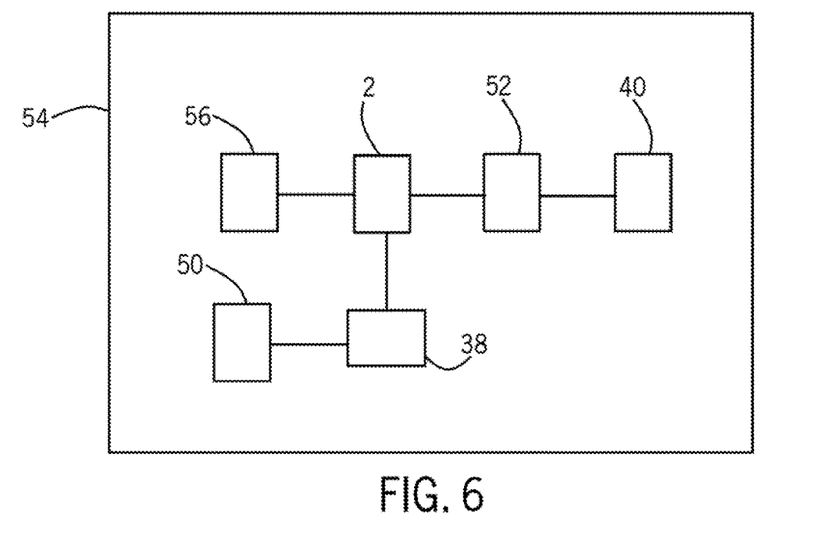
FIG. 6 is a schematic aircraft including the generator.

In one embodiment as depicted in FIG. 5, the power windings comprise a series of independent coils 48 (six independent coils 48 are shown in FIG. 6). Each coil 46 can comprise 1-15, 2-10, 4-8, or 6 turns of electrically conductive wire (wire turns are not individually shown). In one embodiment, each coil 48 includes 6 turns of a continuous electrically conductive wire. The coils 48 are arranged in the stator winding slots 30 in a staggered overlapping manner (i.e., lap windings), such that each stator winding slot 30 includes two layers 32, 34 of power windings.

Thirty six coils 48 can be arranged in the stator winding slots 30. More or less coils 48 can be included in the stator 6 than are depicted in FIG. 5. In this embodiment, each of the coils 48 are arranged in two non-adjacent stator winding slots 30 and span ⅙ of the circumference of the rotor 4.

The first layer 32 and the second layer 34 of power windings each may occupy 10-25%, or ⅙ of a depth of each of the stator winding slots 30 or of a total area occupied by the windings in each of the stator winding slots 30. The third layer 36 of control windings may occupy 50-80%, or ⅔ of the depth of each of the stator winding slots 30 or of the total area occupied by the windings in each of the stator winding slots 30. In another embodiment, the first, second, and third layers 32, 34, 36 each occupy ⅓ of the depth of each of the stator winding slots or of the total area occupied by the windings in each of the stator winding slots 30.

The generator 2 can be included in an aircraft 54 as depicted in FIG. 6, or other vehicle, for generating power for electronic components of the aircraft 54. Conventional generators in aircraft typically include a twenty eight volt direct current brushless starter generator. In such an application, the output frequency from the generator is trivial, as the alternating current produced is rectified to direct current. Therefore, the output frequency can vary, which allows for a constant frequency to be used for the excitation current. Normally, an AC input control signal at some predetermined frequency is used. However in the present generator 2, direct current is used as the excitation current delivered to the control windings in the third layer 36. In this case, the frequency is 0 Hz since the excitation current is direct current.

Figure 1:
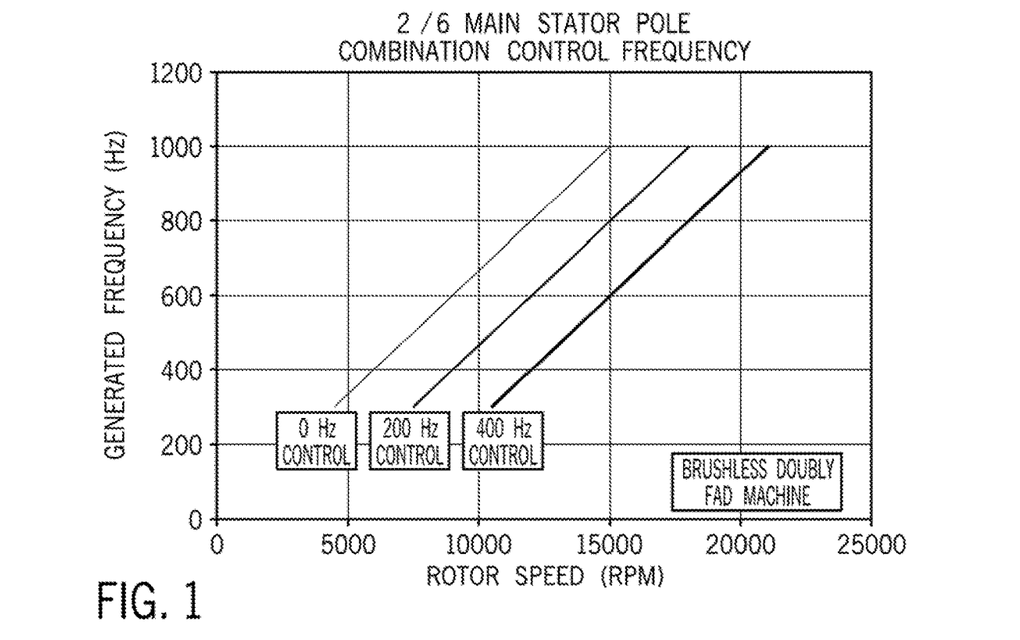
FIG. 1 is a graph showing a frequency of the alternating current produced from a generator according to the present subject matter compared to conventional generators.

As is depicted in FIG. 1, it can be seen that at 0 Hz (i.e., direct current) input control frequency, the generator 2 according to the present subject matter provides a generated output frequency in a convenient range at operating rotor speeds of 4500 to 15000 RPM, which are commensurate with typical shaft speeds for an aircraft generator. From 4500 to 15000 RPM, the output frequency (i.e., line indicated in FIG. 1 as "0 Hz control") for the alternating current produced by the generator 2 is 300 Hz to 1000 Hz. This frequency is comparable to the generated output frequencies (indicated as "200 Hz control" and "400 Hz control") that are produced by a conventional generator and at similar rotor speeds, when an alternating current with a frequency of 200 Hz and 400 Hz is provided as excitation current to the conventional generator.

The advantage of using direct current (having a frequency at 0 Hz) as the excitation current for the present generator 2, is that 3-phase windings are not required for the control windings in the present generator 2. In contrast, these 3-phase windings are required in conventional generators in order to provide an alternating current as excitation current. As previously explained, the generator 2 includes 2-pole single-phase control windings that carry direct current as the excitation current.

As depicted in FIG. 3, 2-pole single-phase control windings can be inserted into the stator winding slots 30 of the stator 6 as an additional layer (i.e., third layer 36), besides the two layers (i.e., first and second layers 32, 34) of 2-pole 3-phase power windings. A direct current controller 50 (e.g. a voltage regulator) simply adjusts the direct current delivered from the direct current power source 38 and into the control windings as excitation current, in order to provide alternating current as output current that has a predetermined frequency at a given rotational speed of the rotor 4.

Using the brushless doubly fed induction starter generator 2 provides a simpler machine (induction) in brushless aircraft engine starting applications, and enables the generator 2 to supply short circuit current.

Therefore, it is desirable to create an induction brushless starter generator, in order to compete in the marketplace for smaller aircraft. Much work has been done to develop an induction brushless starter generator using a normal induction machine; however it has not succeeded in producing a machine that meets all the requirements.

Figure 7:
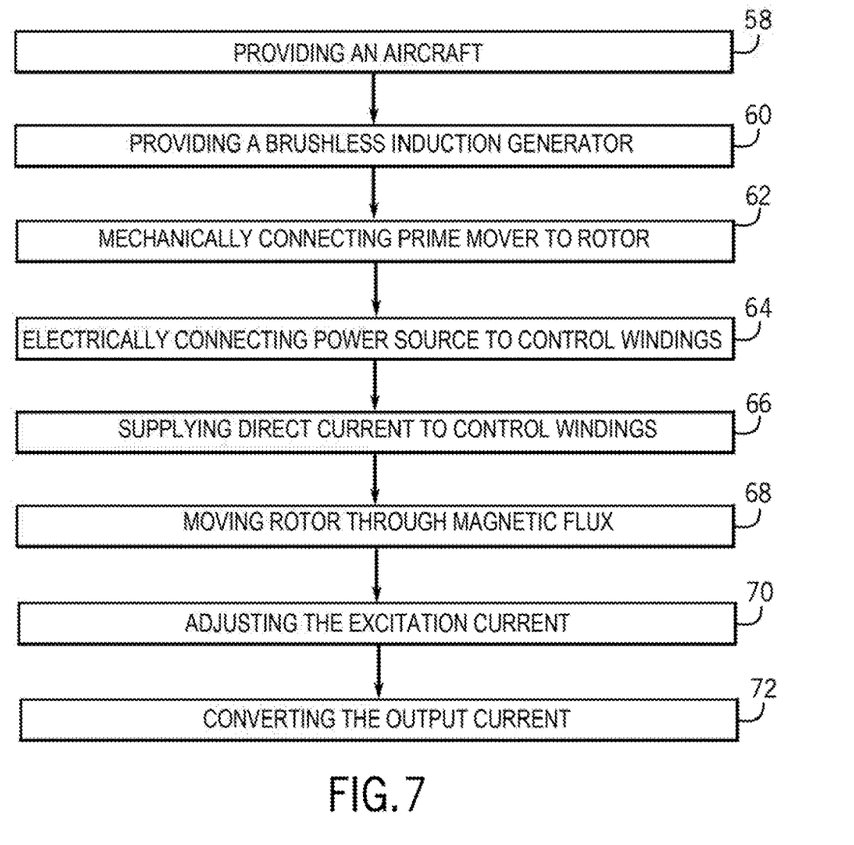
FIG. 7 is a flowchart illustrating a method of generating electrical power.

FIG. 7 illustrates a method of generating electrical power. At 58, an aircraft 54 is provided. The aircraft 54 includes a prime mover 56 and a power source 50 as described herein. At 60, a brushless induction generator 2 is provided, and the generator 2 can be arranged on the aircraft 54. As will be appreciated, the generator 2 may be part of the aircraft 54, and thus providing the generator at 60 may be accomplished in a single step with providing the aircraft at 58. The generator 2 is as described herein, and includes a rotor 4, a stator 6 including power windings and control windings, and an air gap 8 arranged between the rotor 4 and stator 6. At 62, the prime mover 56 is connected to the generator 2, and more specifically, mechanically connected to the rotor 4. At 64, the power source 50 is electrically connected to the control windings.

The method also includes supplying a direct current to the control windings as an excitation current to thereby produce a magnetic flux at 66. The direct current can be provided by the direct current power source 38, optionally the power source 38 on the aircraft 54 that is electrically connected to the generator 2 and controlled by the controller 50. In operation, the controller 50 is used to provide the direct current as an excitation current from the power source 38 to the control windings in the two sets 42, 44 of concentric coils 46. This excitation current produces an excitation magnetic flux in the generator 2.

The method can also include moving the rotor 4 through the magnetic flux, thereby producing an alternating current in the power windings as an output current at 68. The prime mover 56, which can comprise an aircraft engine, delivers rotational power to the rotor 4 to move the rotor 4 through the excitation magnetic flux. This movement of the rotor 4 through the excitation magnetic flux generates and alternating current in the concentric nested loops 16, 18, 20 of the rotor 4, which produces a rotating magnetic flux in the generator 2. At 70, the excitation current can be adjusted in order to provide alternating current as the output current having a predetermined frequency at a given rotational speed of the rotor 4. The rotating magnetic flux generates an alternating current in the power windings, which is delivered to the electrical load 40, optionally through a rectifier 52 that converts the alternating current to direct current at 72.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A brushless induction generator, comprising:
a rotor;
a stator including power windings, control windings, and winding slots, wherein each of the winding slots houses a first layer of power windings, a second layer of power windings, and a third layer of control windings, and wherein the first and second layers of the power windings are not directly coupled to the third layer of control windings; and
an air gap arranged between the rotor and the stator, wherein the third layer is arranged between the air gap and the first and second layers;
wherein the control windings are electrically connected to a power source,
wherein the power source provides direct current as an excitation current to the control windings, thereby producing a magnetic flux,
wherein the rotor moves through the magnetic flux, thereby generating an alternating current in the power windings as an output current,
wherein the power windings comprise 2-pole 3-phase windings and the control windings comprise 2-pole single-phase windings, and
wherein the control windings include two sets of concentric coils, and each of the concentric coils includes 15-25 turns of an electrically conductive wire.

2. The brushless induction generator according to claim 1, wherein:
the first and second layers of power windings each occupy 10-25% of a depth of each of the winding slots; and
the third layer occupies 50-80% of the depth of each of the winding slots.

3. The brushless induction generator according to claim 1, further including a controller that adjusts the excitation current in order to provide alternating current as the output current having a predetermined frequency at a given rotational speed of the rotor.

4. The brushless induction generator according to claim 1, further comprising a rectifier that converts the output current from alternating current to direct current.

5. An aircraft, comprising:
a prime mover;
a power source;
an electrical load; and
a brushless induction generator mechanically connected to the prime mover, and electrically connected to the power source and the load, the brushless induction generator including:
a rotor,
a stator including winding slots, each of the winding slots housing a first layer of power windings, a second layer of power windings, and a third layer of control windings, and
an air gap arranged between the rotor and the stator,
wherein the power windings are not directly coupled to the control windings,
wherein the power source provides direct current as excitation current to the control windings, thereby producing a magnetic flux,
wherein the prime mover moves the rotor through the magnetic flux, thereby generating an alternating current in the power windings as an output current,
wherein the output current is delivered to the electrical load, and
wherein the third layer is arranged between the air gap and the first and second layers.

6. The aircraft according to claim 5, wherein:
the control windings comprise 2-pole single-phase concentric coils; and
each of the concentric coils includes 15-25 turns of a wire.

7. The aircraft according to claim 5, wherein:
the first and second layers each occupy 10-25% of a depth of each of the winding slots; and
the third layer occupies 50-80% of the depth of each of the winding slots.

8. The aircraft according to claim 5, further including a controller that adjusts the excitation current thereby providing alternating current as the output current having a predetermined frequency at a given rotational speed of the rotor.

9. The aircraft according to claim 5, further including a rectifier that converts the output current from alternating current to direct current.

10. The aircraft according to claim 5, wherein the prime mover comprises an engine of the aircraft.

11. The aircraft according to claim 5, wherein the electrical load is an electrical component of the aircraft.

12. A method of generating electrical power, comprising:
providing a brushless induction generator that includes a rotor, a stator including winding slots, power windings and control windings, and an air gap arranged between the rotor and the stator;
supplying a direct current to the control windings as an excitation current to thereby produce a magnetic flux; and
moving the rotor through the magnetic flux, thereby producing an alternating current in the power windings as an output current, wherein the first and second layers each occupy 10-25% of a depth of each of the winding slots and a third layer occupies 50-80% of the depth of each of the winding slots.

13. The method according to claim 12, wherein:
the power windings comprise 2-pole 3-phase windings; and
the control windings comprise 2-pole single-phase windings.

14. The method according to claim 12, wherein:
each of the winding slots houses a first layer of power windings, a second layer of power windings, and a third layer of control windings;
the first and second layers of power windings are not directly coupled to third layer of control windings; and
the third layer is arranged between the air gap and the first and second layers.

15. The method according to claim 12, further comprising:
adjusting the excitation current in order to provide alternating current as the output current having a predetermined frequency at a given rotational speed of the rotor; and
converting the output current from alternating current to direct current.

16. The method according to claim 12, further comprising:
providing an aircraft that includes the brushless induction generator, a power source, and a prime mover;
mechanically connecting the prime mover to the rotor, wherein the prime mover moves the rotor through the magnetic flux;
electrically connecting the power source to the control windings, wherein the power source supplies the excitation current to the control windings.

17. The method according to claim 12, wherein:
the control windings comprise 2-pole single-phase concentric coils; and
each of the concentric coils includes 15-25 turns of a wire.

* * * * *